Oct. 10, 1961 — R. N. ROWE — 3,004,096
BUSWAY CONNECTOR
Filed June 15, 1960 — 2 Sheets-Sheet 1

INVENTOR.
RAYMOND N. ROWE
BY
William D. Roberson

INVENTOR.
RAYMOND N. ROWE
BY
William D. Roberson

United States Patent Office 3,004,096
Patented Oct. 10, 1961

3,004,096
BUSWAY CONNECTOR
Raymond N. Rowe, Plainville, Conn., assignor to General Electric Company, a corporation of New York
Filed June 15, 1960, Ser. No. 36,389
6 Claims. (Cl. 174—88)

This invention relates to busway systems, and more particularly to busway systems made up of a number of end-connected busway sections each including rigid mutually insulated bus conductors enclosed within a surrounding housing.

The installation and interconnection of busway sections adapted to be joined end-to-end and suspended from a wall or ceiling to form an electrical distribution system is often relatively cumbersome and tedious, requiring the bolting together of a large number of individual pairs of bus bars. In a typical system, for example, there are several bars in each section, each bar requiring two bolts to connect it to the corresponding bar of the next succeeding section, such that many bolts are required to be tightened at every section joint. Each of such bolts must be tightened to exert a force on the bus connection of approximately 2000 pounds. The maintenance of such a system also requires individually checking each of the bolted connections periodically.

The physical positioning of each section during installation, prior to bolting together of the bus bars, is often relatively difficult. Thus, each busway section to be installed must be independently elevated and maneuvered into position with its bars overlapping and interleaved with the bars of the preceding section and carefully adjusted so that the holes of the overlapped bars are in alignment before bolting together can be accomplished. In such systems the tolerance problems alone between the dimensions of busway housings and their included bus conductors can be formidable.

This invention has as one of its objects the provision of a novel busway construction in which the interconnection between lengths of bus conductors in a system is accomplished by simple plug-in joint connectors after the busway housings are fastened together, the joint connectors being secured in place by a relatively simple clamping arrangement.

A further object of my invention is to provide such a busway construction with unique plug-in interconnection joints between the bus conductors of adjacent sections which permit a section of the busway system to be installed or removed from an intermediate portion of a continuous run without requiring physical movement of the adjacent sections.

Briefly stated, in accordance with the invention, a bus system is provided in which the bus conductors in end connected busway sections are joined together by a unitary joint connector plugged into adjacent ends of busway sections and clamped thereon after the busway housings are joined together.

Further details of the invention as well as additional objects and advantages will be more readily understood in connection with the following detailed description taken together with the accompanying drawings in which.

Figure 1:
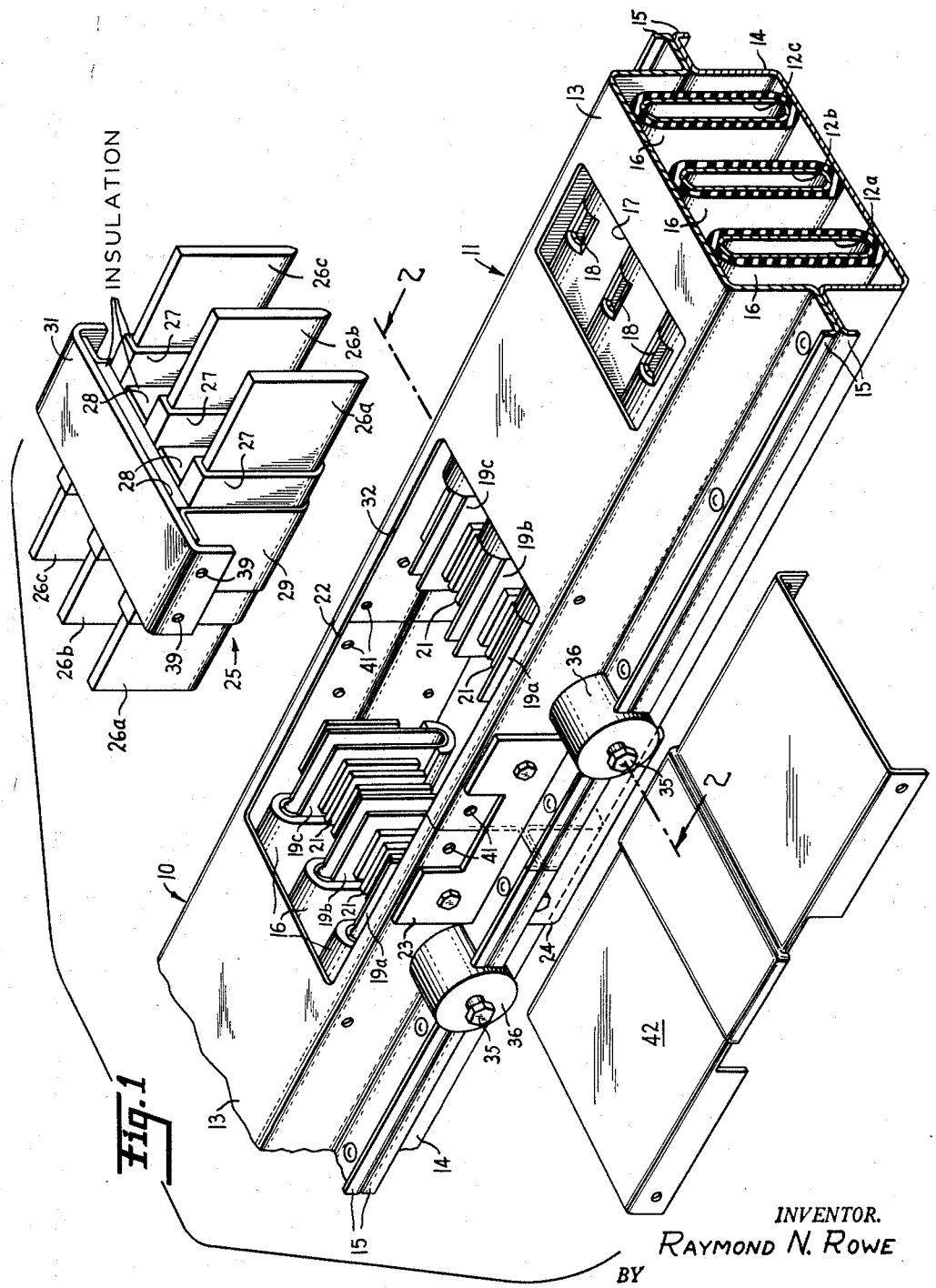
FIGURE 1 is a perspective view of the adjoining ends of a pair of busway sections constructed in accordance with this invention showing a plug-in joint connector and the cover of the joint removed.

The portion of a busway system shown in FIGURE 1 includes the adjoining ends of two busway sections 10 and 11, both sections being shown broken off to confine the illustration to details relevant to the invention. Each of these busway sections includes three bus conductors 12a, 12b, and 12c, the letter designation being employed to denote the respective phase relationships of the conductors in a polyphase electrical system. The sections include elongated rectangular housings formed of two channel-shaped steel housing halves 13 and 14 respectively, each of the housing halves having outwardly turned flanges 15 fastened together thereby providing a hollow interior portion in the busway housing in which the bus conductors are situated.

The bus conductors in the FIGURE 1 embodiment are formed of sheet stock rolled into tubular shape with an elongated cross section and are covered substantially throughout their lengths by sheaths of insulating material 16. Where necessary, portions of the insulating sheaths are cut away to expose the bus conductors for the purposes of making electrical contact therewith. As an illustration of the functional utility of the busway system an opening 17 is shown directly above a plug-in section of the busway to expose the stab receiving portions 18. These stab-receiving portions are provided by cutting away not only a portion of the insulating sheaths but also the topmost edge of each bus conductor to permit a plug-in connection to be made between the terminals of a plug-in power take-off device not shown and the inner surfaces of bus conductors 12a, 12b, and 12c. The ends 19a, 19b, and 19c of the several bus conductors are also exposed by the removal of some of the sheath insulation and a portion of their topmost edges.

It is to be noted that the bus conductors are positioned within their respective housings spaced apart in a row from side to side of the housing with means provided to insure separation between conductors of different phase relationships. A portion of the spacing means provided is shown as comprising insulating spacers 21 positioned between the exposed ends of the bus conductors. These spacers are preferably prefigured by deep parallel grooves extending about them as shown to increase the oversurface distance between adjacent bus conductors and to minimize creep tracking. It is also to be noted that the bus conductors terminate short of the ends of their associated housings. Hence, when the two sections 10 and 11 are brought together in end-to-end relationship with their respective housings butted at joint 22, no attention need be given to the establishment of electrical connections between the respectively phased conductors in each section. Indeed, the bus conductors in one section can in no way interfere with the bus conductors in the adjoining section because of the separation between their ends. When the sections are properly positioned adjacent each other the housings are joined together by fastening means preferably in the form of steel straps 23 and 24 spanning the butt joint 22 and bolted to each section.

After the bus sections are positioned and joined (any given installation would usually include many such sections joined end-to-end) the electrical interconnection of the bus conductors may then be carried out expeditiously by the insertion of the unitary joint connector 25. This joint connector includes three bar-type connecting conductors 26a, 26b, and 26c grouped in a common assembly, insulated except at their exposed ends by sheaths 27 of insulation which surround their central portions, and spaced apart by spacers 28 which are preferably of a somewhat resilient insulating material. The group of bus conductors 26 and spacers 28 is united in one assembly by the U-shaped bracket 29 and the overlying plate 31, both of which are fastened together to encircle the bus bars and spacers.

In order to permit the entry of the joint connector 25 into the bus assembly the upper housing halves 13 are cut away adjacent their ends at 32 to provide an opening which spans the joint between the busway sections and exposes the ends 19a, 19b, and 19c of the bus conductors. Upon insertion of the joint connector the uninsulated ends of connecting conductors 26a, 26b, and 26c slip within the hollow ends of the respective bus conductors into frictional engagement with the internal surfaces thereof. The resulting relationships are seen clearly in FIGURE 2 which shows each connecting conductor 26 gripped on both sides by a respective enveloping bus conductor, the several mated elements being spaced apart by the insulating spacers 28.

Figure 2:
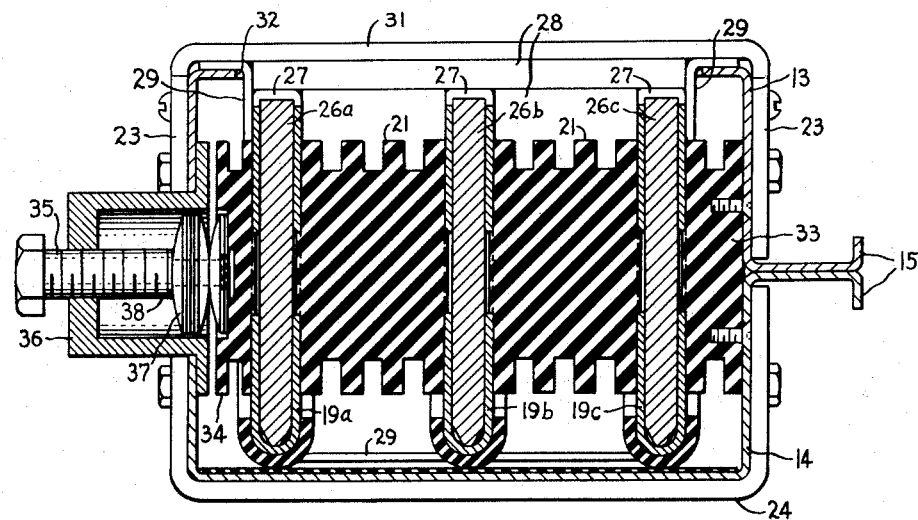
FIGURE 2 is a cross-sectional view taken on line 2—2 of FIGURE 1 showing the joint connector in position on the busway.

After insertion of the joint connector the connections are made secure by clamping means which apply a compressive force from side-to-side of the entire joint assembly. The clamping means is shown in FIGURE 2 as comprising a fixed pressure block 33 adjacent one side of the busway housing and a movable pressure block 34 adjacent the other side of the housing, both pressure blocks being made of an insulating material and bearing directly on the outermost bus conductors at the bus joint. To exert the compressive force between the two pressure blocks 33 and 34, a bolt 35 is threadably received in a cup-shaped guide member 36 affixed to an inner surface of the busway housing and extending through an opening to the outside thereof. The inner end of bolt 35 is reduced in diameter and carries thereon a plurality of dished spring steel washers 37 of the Belleville variety. The reduction in diameter of the end portion of bolt 35 produces a shoulder 38 against which the spring washers are pressed. The spring washers are retained on the inner end of the bolt 35 by an enlargement of the inner end of the bolt. When the bolt 35 is tightened to compress the spring washers against the movable pressure block, the busway housing participates in the clamping operation, being placed in tension between the stationary pressure block 33 and the movable pressure block 34. Consequently, the entire joint connection at the end of a busway section is clamped by tightening the one bolt. In order to provide the desired force and the desired amount of resilient movement, a plurality of washers 37 are provided, and arranged in the particular manner illustrated, in which the first two spring members adjacent the pressure block 34 are arranged in nested relation with their concave sides directed toward the bus assembly, followed by a pair of spring members in nested relation having their concave sides directed away from the bus bar assembly, and finally by a third pair of nested spring members having their convex sides directed in the same direction as the first pair. The arrangement of such dish-shaped spring washers in nested relationship with different orientations of their concavities may be varied to produce a given force for a predetermined lateral movement of bolt 35. In the embodiment shown a single spring washer produces a force of 1200 pounds when in flattened condition with a total movement of .05 inch. The combination shown therefore produces a total force of 2400 pounds with a total travel of .15 inch.

After the joint connector 23 is in position and the clamping means in each busway section are tightened, the plate 31 of the joint connector may, if desired, be fastened to the busway housings by screws or the like inserted through holes 39 and 41. Thereupon cover plate 42 may be applied and affixed over the opening 32 to cover the assembled joint.

Figure 3:
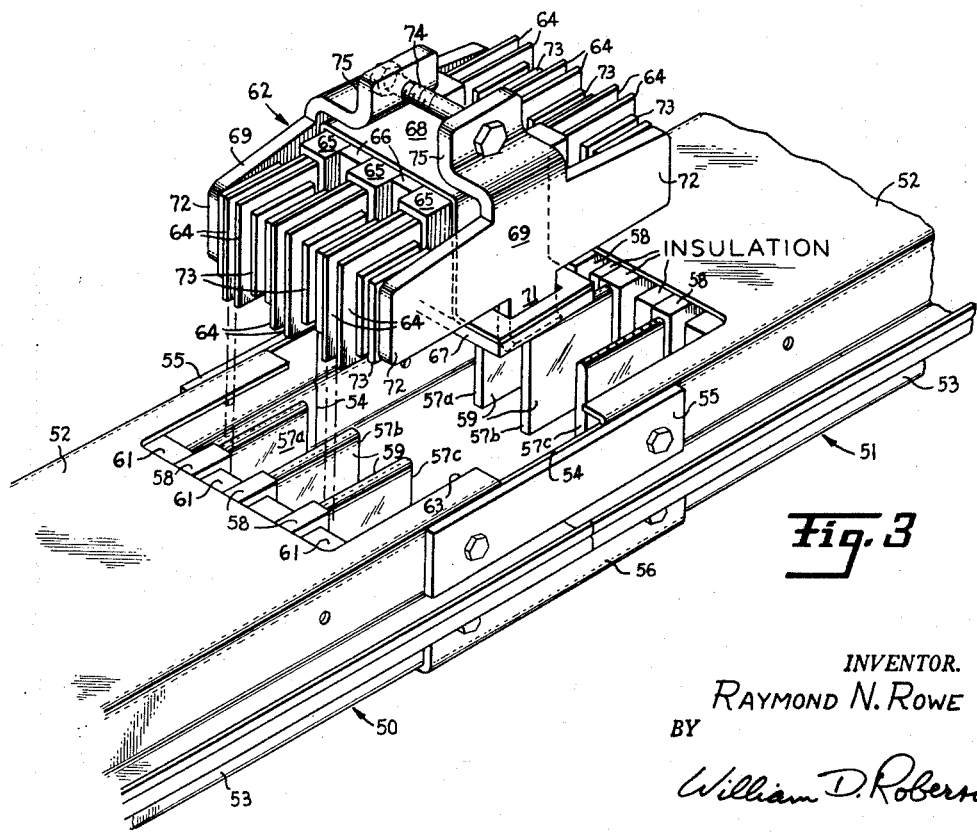
FIGURE 3 is a perspective view of an alternative embodiment of the invention showing the adjoining ends of two other busway sections with a different form of joint connector removed.

In the alternate embodiment of this invention shown in FIGURE 3 the housings of each section 50 and 51 are formed, as in the preceding example, of opposed channel-shaped steel housing halves 52 and 53, adjacent busway sections being butted end-to-end at joint 54 and fastened together by steel straps 55 and 56 spanning the butt joint. In this example the mutually insulated bus conductors 57a, 57b, and 57c enclosed within the housing are of the bar type arranged in a row from side to side of the busway and are sheathed by insulating material 58 except at their end portions which are laid bare of insulation. The bus conductors 57a, 57b, and 57c are positioned on approximate centers by means including insulating spacers 61 and terminate short of the ends of their associated housings. At any time after the housings are fastened together the joint connector 62 may be slipped into position through the opening 63 formed by the cutaway portions at the adjoined ends of the busway housings.

The joint connector 62 shown in FIGURE 3 is again a unitary assembly adapted to be plugged onto the ends 57 of the bus conductors in frictional engagement therewith and to be clamped firmly thereon to establish reliable electrical continuity between respective pairs of bus conductors in the two bus sections. For this purpose the joint connector 62 is provided with six bus members 64 grouped in pairs, each bus member in a pair being spaced from the other bus member in that pair by a distance slightly larger than the width of a bus conductor 57, and each pair being insulated and spaced from the other pairs by insulating sheaths 65 about their midportions and by insulating spacers 66, preferably of a somewhat resilient material, between the pairs of bus members. To grip the bus members 64 and their associated insulating elements in a common assembly, these members are positioned on a stout base plate 67 and covered with an inverted channel-shaped retainer 68. On opposite sides of the assembly are mounted clamping members 69 each having a lower lug 71 extending into an aperture in an end of the base plate 67 and retainer 68. The clamping members 69 are provided with extending arms 72 which bear against the outermost ones of a group of grooved insulating spacers 73 positioned and fastened between ends of respective pairs of bus members 64. A threaded bolt 74 engages the upward projections 75 of the clamping members.

After the joint connector 62 is slipped into place on the ends of bus bars 57a, 57b, and 57c, it is necessary only to tighten bolt 74 to secure the joint. In this operation the clamping members rock about their lugs 71 placing the base plate 67 in tension, and compressing between the ends of the arms 72 both assembled joints simultaneously.

It can be seen that in each of the embodiments shown and described herein the bus connections may be made after an entire bus system is installed with its housings interconnected. Furthermore, if it should be necessary to replace or to substitute an existing length of busway in an installed system, it is necessary only to loosen the joint at each end of the bus section to be removed, to disconnect the adjoined housings, and to drop the bus section out of the bus run without moving or disturbing any of the other bus sections in the system.

While I have shown but two specific embodiments of my invention, it will be obvious to those skilled in the art to which it pertains that certain variations may be made in these structures without departing from the principles of the invention. I therefore wish to cover by the appended claims all such variations as fall within the true spirit and scope of my invention.

What I claim as new and desire to secure by Letters Patent of the United States is:

1. A busway system comprising: a plurality of sections of busway, each comprising an elongated housing and a plurality of bus conductors supported in parallel side-by-side relation lengthwise of said housing, the bus conductors in each of said sections terminating short of the ends of their associated housings, a portion of the housings adjacent the ends of the busway sections being cut away to expose the ends of the bus conductors therein; the housings of said busway sections being connected in end-to-end relationships with said cutaway portions forming a composite opening, and with said conductors of one section being longitudinally spaced from the conductors of the other section such that the ends of the conductors are exposed through said composite opening, a unitary joint connector for establishing electrical continuity between respective bus bars in said end connected busway sections comprising an assembly of mutually insulated conducting links bound together as a unit, insulating members between said conducting links separating them on centers spaced apart by an amount approximately equal to the spacing between centers of the ends of said bus conductors, said connector and said composite opening being dimensioned such that the connector can be inserted and withdrawn through the opening in directions extending substantially perpendicular to the direction of elongation of the conductors, the ends of said conducting links engaging the respective ends of said bus conductors to establish a friction fit connection therebetween, and clamping means for compressing the interengaged ends of said bus conductors and conducting links to establish firm electrical continuity between respective bus bars in adjoined busway sections.

2. A busway system comprising: at least two sections of busway connected end-to-end, each comprising an elongated housing and containing therein a plurality of bus conductors insulated from each other and spaced in a row laterally of said housing, said bus conductors terminating short of the ends of their respective housings so that the conductors of the two sections are spaced longitudinally with respect to each other, said bus conductors having uninsulated surfaces at the ends thereof to facilitate electrical connection thereto, a portion of said housings adjacent the ends thereof being cut away to provide a composite opening which exposes the said uninsulated end surfaces of said bus conductors; a plug-in unitary joint connector including a group of connecting conductors of a length sufficient to overlap the ends of said bus conductors, said connector and said composite opening being dimensioned to permit insertion and withdrawal of the connector through the opening in directions generally perpendicular to the direction of extension of the conductors, said connecting conductors being in frictional engagement with the said uninsulated end surfaces of the bus conductors in each of said two adjoined busway sections, and means insulating said connecting conductors and spacing them apart from center-to-center by an amount approximately equal to the center-to-center spacing of said bus conductors; insulating spacers positioned between the frictionally engaged ends of said bus conductors and said connecting conductors; and clamping means for compressing said insulating spacers and the frictionally engaged ends of said bus conductors and connecting conductors to provide reliable electrical continuity between respective bus conductors in adjoined busway sections.

3. A busway system comprising: at least two sections of busway connected end-to-end, each section comprising an elongated housing and contained therein a plurality of channel-shaped bus conductors insulated from each other and spaced in a row laterally of said housing, said bus conductors terminating short of the ends of their respective housings, such that the conductors of the two sections are longitudinally spaced with respect to each other, said bus conductors having uninsulated internal surfaces at the ends thereof to facilitate plug-in electrical connection thereto, a portion of said housings adjacent the ends thereof being cut away to provide a composite opening which exposes the said uninsulated end surfaces of said bus conductors; a plug-in unitary joint connector including a group of electrically conducting connecting bars of a length sufficient to overlap the ends of said bus conductors, said connector and said composite opening being dimensioned to permit insertion and withdrawal of the connector through the opening in directions extending generally perpendicular to the direction of extension of said conductors, said connecting bars being positioned within the said uninsulated internal end surfaces of the channel-shaped bus conductors in each of said two adjoined busway sections, and means insulating said connecting conductors and spacing them apart from center-to-center by an amount approximately equal to the center-to-center spacing of said bus conductors; insulating spacers positioned between the frictionally engaged ends of said bus conductors and said connecting bars; and clamping means for compressing said insulating spacers and the frictionally engaged ends of said bus conductors and connecting bars to provide reliable electrical continuity between respective bus conductors in adjoined busway sections.

4. A busway system comprising: at least two sections of busway connected end-to-end, each section comprising an elongated housing and containing therein a plurality of bus bars insulated from each other and spaced in a row laterally of said housing, said bus bars terminating short of the ends of their respective housings such that the bus bars of the two sections are spaced longitudinally with respect to each other, said bus bars having uninsulated surfaces at the ends thereof to facilitate electrical connection thereto, a portion of said housings adjacent the ends thereof being cut away to provide a composite opening which exposes the said uninsulated end surfaces of said bus bars; a plug-in unitary joint connector including a group of connecting conductors of a length sufficient to overlap the ends of said bus bars, said connector and said composite opening being dimensioned to permit insertion and withdrawal of the connector through the opening in directions generally perpendicular to the direction of extension of the bus bars, said connecting conductors gripping the said uninsulated end surfaces of the bus bars in each of said two adjoined busway sections, and means insulating said connecting conductors and spacing them apart from center-to-center by an amount approximately equal to the center-to-center spacing of said bus bars; insulating spacers positioned between the frictionally engaged ends of said bus bars and said connecting conductors; and clamping means for compressing said insulating spacers and the frictionally engaged ends of said bus bars and connecting conductors to provide reliable electrical continuity between respective bus bars in adjoined busway sections.

5. A system as defined in claim 4 wherein said clamping means is carried entirely by said connector.

6. A system as defined in claim 4 wherein said clamping means includes a plate extending transversely of said connecting conductors at one side thereof and having an aperture, clamping members adjacent outer ones of said connecting conductors, each clamping member including a first extension projecting into the aperture of said plate and a second extension projecting to the side of the connecting conductors opposite to the side thereof containing said plate, each of said second extensions having an opening therein, and a threaded bolt extending through said openings.

References Cited in the file of this patent

UNITED STATES PATENTS

| | | |
|---|---|---|
| 2,906,811 | Fisher | Sept. 29, 1959 |
| 2,938,971 | Meacham et al. | May 31, 1960 |